United States Patent
Brooks

(10) Patent No.: US 7,394,773 B2
(45) Date of Patent: Jul. 1, 2008

(54) NETWORK BRIDGE UPLINK PORT IDENTIFICATION

(75) Inventor: Jason D. Brooks, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 815 days.

(21) Appl. No.: 10/695,240

(22) Filed: Oct. 27, 2003

(65) Prior Publication Data

US 2005/0089051 A1    Apr. 28, 2005

(51) Int. Cl.
*H04Q 7/34* (2006.01)
(52) U.S. Cl. .............. 370/254; 370/241; 370/395.2; 370/395.31; 370/400; 370/401; 375/224
(58) Field of Classification Search .............. 370/255
See application file for complete search history.

(56) References Cited

U.S. PATENT DOCUMENTS

2002/0167914 A1* 11/2002 Haneda ............... 370/255

2003/0086425 A1* 5/2003 Bearden et al. ............. 370/392

OTHER PUBLICATIONS

An algorithm for physical network topology discovery, Journal of Computer Research and Development, vol. 39, No. 3, p. 264-268.
Research on multilayer network topology discovery algorithm based on Intranet, J. Huanzhong Univ. of Sci & Tech, vol. 26, No. 11, p. 22-25.

* cited by examiner

*Primary Examiner*—Huy D. Vu
*Assistant Examiner*—Salvador E. Rivas
(74) *Attorney, Agent, or Firm*—Richard A. Koske; James H. Walters; George T. Noe

(57) ABSTRACT

An ICMP ping is sent from a test instrument to all known bridges and switches on a network, which respond by populating the forwarding data base (FDB) tables with the MAC addresses of adjacent bridges. Then an SNMP query is sent to the FDB table of a selected bridge, retrieving not only MAC addresses, but interface indices associated with ports of downstream bridges. These ports are identified as uplink ports.

2 Claims, 2 Drawing Sheets

NETWORK BRIDGE UPLINK PORT IDENTIFICATION

BACKGROUND OF THE INVENTION

This invention relates generally to network testing, and in particular to a method of identifying network bridge uplink ports.

Standards for ensuring reliable full-duplex transmission of data from one machine to another include the Transmission Control Protocol (TCP) and Internet Protocol (IP), which were merged into the TCP/IP Internet Protocol Suite, and are referred to today as simply the TCP/IP protocols. The operational hierarchy and structure of networks themselves are based on the Open Systems Interconnection (OSI) seven-layer model, which arose from a reference model created by the International Standards Organization as standard ISO/IEC 7498.

Network test and diagnostic instruments necessarily employ the TCP/IP protocols, and appear at the network portal as just another device on the network. These instruments have displays that provide graphic and text information, including showing the user diagrams of entire configured networks, problems detected, protocol statistics, and devices and networks discovered. The discovery system in a sophisticated network test instrument utilizes the echo request-and-reply feature of the Internet Control Message Protocol (ICMP) to differentiate between hosts, interconnect devices such as switchers and routers, servers, printers and Simple Network Monitoring Protocol (SNMP) devices in gathering information about the network.

Operational boundaries with the OSI seven-layer model are created by repeaters, bridges and switches, and routers. For example, bridges and switches operate within layer 2 based on the OSI seven-layer model, while routers are deployed at the operational boundary between layer 2 and layer 3. That is, routers are used to connect a local network to another network, or to connect multiple networks together. In testing interconnected multiple networks, or even testing large networks that employ multiple bridges and switches to interconnect several devices, it is difficult to identify uplink switch ports where such information is not available in the SNMP database, also known as the SNMP Management Information Base (MIB). An uplink port is a switch or bridge port that is connected to another network interconnect device, such as a bridge or a router, and has a Media Access Control (MAC) address of other switches or bridges beyond the immediate physical layer. Heretofore, the user has had to have knowledge of such uplink ports and manually load the MAC addresses, which are physical addresses, into the MIB. This is a major inconvenience for a technician faced with testing and analyzing a network, and without the needed uplink port information incomplete or incorrect test results follow. Identification of trunk ports is crucial in generating accurate network maps and finding the switch port where a specific device is connected.

It would be desirable to incorporate a feature into a network test instrument that would allow it to identify uplink switch ports where such information is not available in the SNMP MIB.

SUMMARY OF THE INVENTION

In accordance with the present invention, a network test and analysis instrument is provided with a method of identifying uplink switch ports.

A test instrument performs a discovery process to locate all devices on a network of interest, including a list of all bridges and swtiches. Then an ICMP ping is sent from the test instrument to all known bridges and switches on the network, which respond by populating the forwarding data base (FDB) tables of the bridges with the MAC addresses of adjacent bridges. Then an SNMP query is sent to the FDB table of a selected bridge, retrieving not only MAC addresses, but interface indices associated with ports of downstream bridges. These ports are identified as uplink ports.

In the event no MAC addresses were found in the FDB, or to double check that all uplink ports have been identified, the contents of the FDB tables of all the known bridges are downloaded and a count made of all the MAC addresses associated with each uplink port. A bridge port that is not an uplink port will have only a limited number of MAC addresses associated with it, so if the count at a given bridge port exceeds a predetermined number, the port is flagged as an uplink port.

Once the uplink ports have been identified within a network, an accurate network map can be drawn. Also, bridge ports where specific devices, such as a PC or a printer, for example, are connected, can easily be located.

Other objects, features, and advantages of the present invention will become obvious to those having ordinary skill in the art upon a reading of the following description when taken in conjunction with the accompanying drawings.

DETAILED DESCRIPTION OF THE INVENTION

Figure 1:
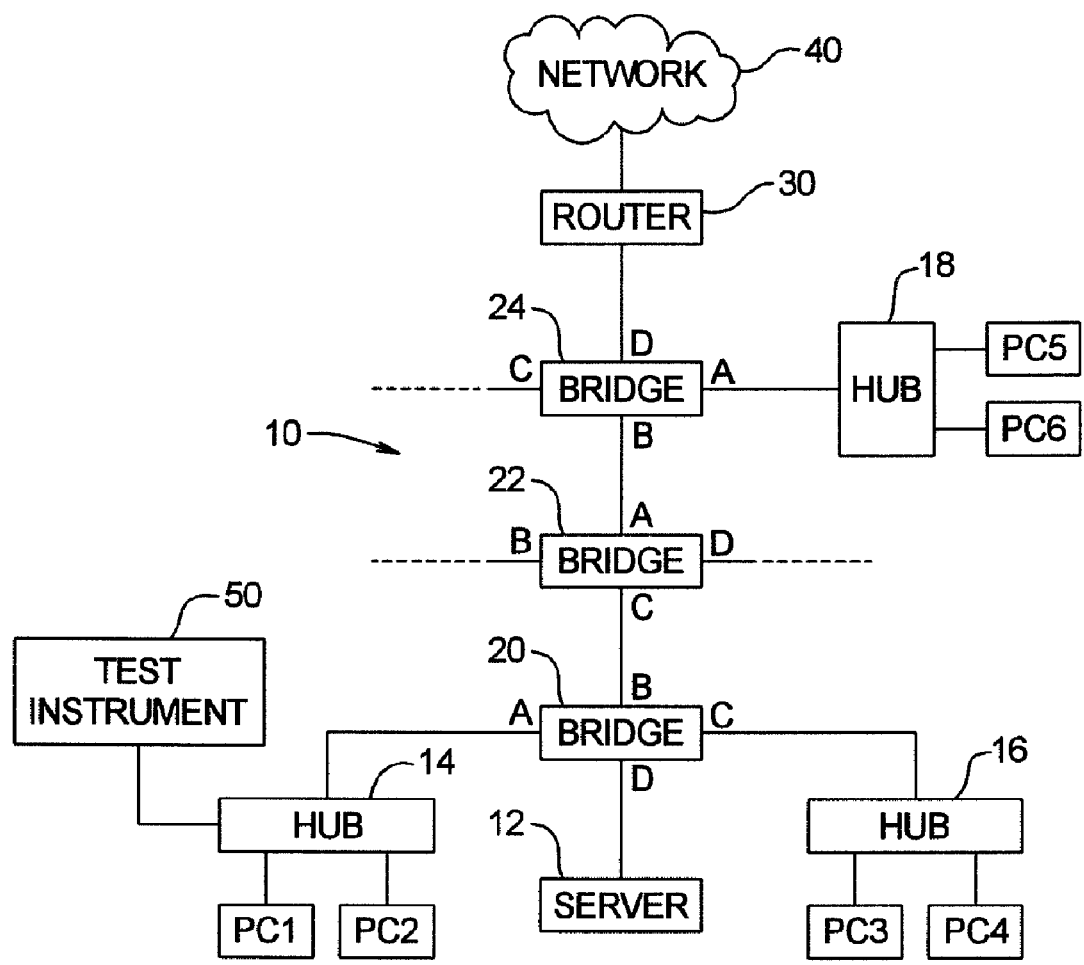
FIG. 1 is a block diagram of an exemplary simple network for purposes of explaining the invention.

Referring now to the drawings, FIG. 1 is block diagram of an exemplary local network 10 that includes, for purposes of discussion, six computers PC1 through PC6 and a server 12 interconnected by hubs 14, 16 and 18, and multi-port switches (bridges) 20, 22 and 24. The local network 10 is connected via a router 30 to another network 40. A test instrument 50 is shown connected into a convenient interface port, such as hub 14, to perform network analysis. Note the ports for bridges 20, 22, and 24 are labeled A, B, C, and D, and are assigned randomly since it does not matter which port is used for the connection of any device.

It can be appreciated that the rules governing operating functions and protocol for OSI layers 1 and 2 apply, and each device on the network has a unique physical address (MAC address). In our example, segments of the network are separated by bridges 20, 22, and 24. The dashed lines shown connected to ports B and D of bridge 22 and ports A and C of bridge 24 represent that additional devices are connected to those ports. Each bridge includes SNMP management capability including a MIB, which is a data base table that contains the MAC addresses for the devices connected to that bridge. For example, bridge 20 has stored in its MIB table the MAC addresses of PC1 through PC4 connected to ports A and C, server 12 connected to port D, and bridge 22 connected to port B. Likewise, bridges 22 and 24 have MIB tables containing the MAC addresses devices connected to their respective ports.

Test instrument 50 employs the conventional ICMP echo request-and-reply (ping) process to discover all of the devices within network 10. However, in order to generate accurate network maps and to find switch ports where specific devices are connected, trunk ports or uplink ports must be identified. Again, only uplink ports will have the MAC address of other bridges or switches since the other ports will have end nodes as described in the foregoing paragraph with respect to bridge 20. So through the conventional discovery process, test instrument 50 can learn that devices such as PC5 and PC6 are in the network somewhere, and no details as to specific locations are provided.

Figure 2:
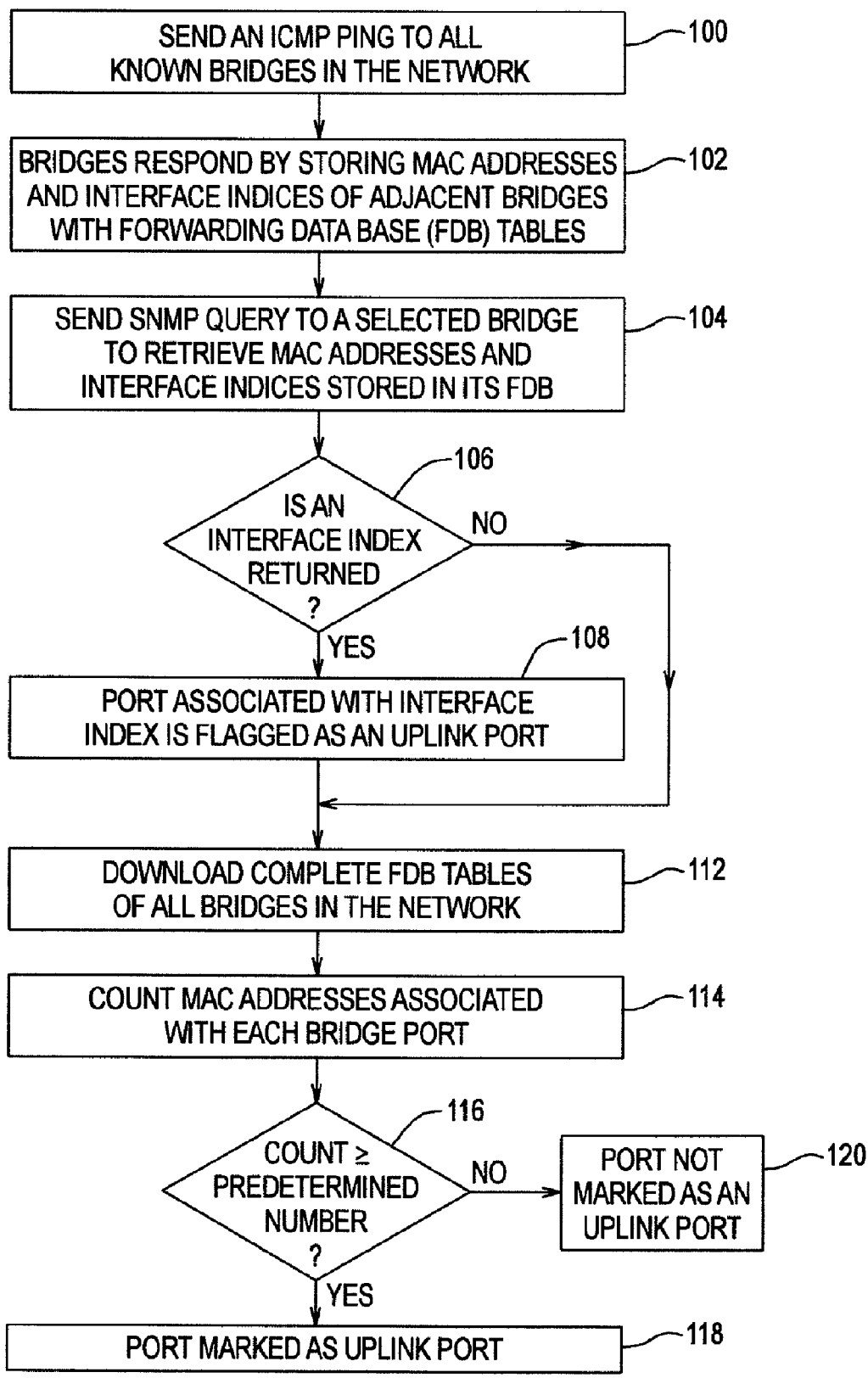
FIG. 2 is a flow chart of the implementation of a method for identifying switch uplink ports.

Now refer to FIG. 2, which is a flow chart of the implementation of a method for identifying switch uplink ports and locating bridge ports where specific devices are located once the initial discovery is completed and a list of bridges and switches is now available. In step 100, an ICMP ping is sent to all the known bridges or switches in the network 10. In step 102, the forwarding data base (FDB) table of each bridge within network 10 is populated with the MAC addresses and interface indices of any adjacent bridges or switches. Each ethernet port has an interface index associated with it, and the interface indices are stored in the FDB along with MAC addresses. That is, the FDB table stores any MAC addresses with the interface index (port) where the MAC address was "seen." In step 104, an SNMP query is sent to a selected bridge to retrieve all the MAC addresses stored in its FDB. In step 106, if the MAC address of a selected bridge is present in the FDB table, it means that the port associated with the interface index, which is returned with the MAC address, is by definition an uplink port, and is flagged as such in step 108. There are at least two ways that data can be retrieved from the FDB tables. One way is to query the bridge for a specific MAC address, whereby the bridge will return either the FDB entry in terms of both a MAC address and an interface index, or an error message indicating "No Such Name," i.e., not found. The other way is to step through the FDB tables asking for all its entries. The complete table is then returned with each entry having two fields: MAC address and interface index. For example, if bridge 22 receives an SNMP query for any MAC addresses stored in its FDB tables, bridge 22 will respond by providing MAC addresses and corresponding interface indices for bridges 20 and 24. Since the interface index is associated with port B of bridge 20 in our example, port B of bridge 20 is identified as an uplink port. Likewise, if bridge 24 is queried, MAC addresses and corresponding interface indices for bridge 24 and router 30 will be returned, and port A of bridge 22 will be identified as an uplink port. From these data, then, it can be discerned that an accurate route can be drawn from test instrument 50 to router 30 via bridges 20-24.

In the event no MAC addresses were found in the FDB tables, or to double check that all uplink ports have been identified, the complete contents of the FDB tables of bridges 20, 22, and 24, which includes the MAC addresses of all devices in network 10 may be downloaded as provided in step 112. Then, in step 114 a count is made of all the MAC addresses associated with each port. If the count exceeds a predetermined user-provided number (step 116), the port is marked as an uplink port (step 118). If the count does not exceed the predetermined number, the port is not marked as an uplink port (step 120). Thus, uplink ports may be readily verified, and overlooked or missed uplink ports may be identified.

Once the uplink ports have been identified within the network, an accurate network map can be drawn, showing all devices connected therein. Also, bridge ports where specific devices, such as PC5 and PC6, for example, are connected, can easily be located.

While I have shown and described the preferred embodiment of my invention, it will be apparent to those skilled in the art that many changes and modifications may be made without departing from my invention in its broader aspects. It is therefore contemplated that the appended claims will cover all such changes and modifications as fall within the true scope of the invention.

What I claim as my invention is:

1. A method of identifying a bridge uplink port in a network, comprising the steps of: (a) sending an ICMP ping to all bridges known within said network and causing forwarding data base tables of said bridges to store MAC addresses and interface indices of adjacent bridges; (b) sending an SNMP query to a selected bridge to retrieve stored contents of a forwarding data base table of said selected bridge; (c) for any interface index retrieved from said selected bridge, identifying a port associated with said interface index as an uplink port of an adjacent bridge; (d) downloading the contents of all of said forwarding data base tables of said known bridges; (e) counting a number of MAC addresses associated with each port of said bridges; and (f) identifying a port as an uplink port if said number of MAC addresses counted exceeds a predetermined number.

2. A test instrument operation method for employing the test instrument to identify a bridge uplink port in a network, comprising the steps of: connecting the test instrument to the network; sending from the test instrument an ICMP ping to all bridges known within said network and causing forwarding data base tables of said bridges to store MAC addresses and interface indices of adjacent bridges; sending an SNMP query from the test instrument to a selected bridge to retrieve stored contents of a forwarding data base table of said selected bridge; and for any interface index retrieved from said selected bridge, having the test instrument identify a port associated with said interface index as an uplink port of an adjacent bridge; downloading to the test instrument the contents of all of said forwarding data base tables of said known bridges; counting a number of MAC addresses associated with each port of said bridges; and identifying a port as an uplink port if said number of MAC addresses counted exceeds a predetermined number.

* * * * *